United States Patent
Gencyuz et al.

(10) Patent No.: US 7,847,680 B2
(45) Date of Patent: Dec. 7, 2010

(54) MOTOR VEHICLE GEAR SELECTOR WITH INTEGRATED DISPLAY

(75) Inventors: Mete I. Gencyuz, Farmington Hills, MI (US); Paul R. Williams, Northville, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 324 days.

(21) Appl. No.: 11/950,649

(22) Filed: Dec. 5, 2007

(65) Prior Publication Data
US 2009/0146798 A1   Jun. 11, 2009

(51) Int. Cl.
*B60Q 1/00* (2006.01)
(52) U.S. Cl. .................................... 340/456; 200/61.88
(58) Field of Classification Search ................ 340/456, 340/438; 180/271; 200/61.88
See application file for complete search history.

(56) References Cited

U.S. PATENT DOCUMENTS

| | | | |
|---|---|---|---|
| 5,021,764 A * | 6/1991 | Mabee | 340/456 |
| 6,204,752 B1 * | 3/2001 | Kishimoto | 340/438 |
| 6,246,127 B1 * | 6/2001 | Weilbacher et al. | 340/456 |
| 6,559,764 B1 * | 5/2003 | Neuner et al. | 340/438 |
| 6,707,379 B2 * | 3/2004 | Nagasaka | 340/456 |
| 6,781,512 B2 * | 8/2004 | Hayashi et al. | 340/456 |
| 7,081,812 B2 * | 7/2006 | Hastings, Sr. | 340/456 |
| 2006/0216675 A1 * | 9/2006 | Ruttiger et al. | 340/456 |
| 2007/0101819 A1 | 5/2007 | Kerber et al. | |
| 2008/0094199 A1 * | 4/2008 | Kazyaka | 340/456 |

FOREIGN PATENT DOCUMENTS

DE    20311729 U1    10/2003

OTHER PUBLICATIONS

Office Action issued on Mar. 19, 2010, for German Patent Application No. 102008059982.

* cited by examiner

*Primary Examiner*—John A Tweel, Jr.
(74) *Attorney, Agent, or Firm*—Ingrassia Fisher & Lorenz, P.C.

(57) ABSTRACT

Motor vehicle gear selectors, methods for integrating a variable display on the gear selector, and motor vehicles including a gear selector with an integrated display are provided. One gear selector includes a body and a variable display integral with the body and configured to display a message. The gear selector also includes a processor configured to select the message from a message set and communicate the message to the variable display. Another gear selector includes a shift console, a gear selector body, a variable display integral with the gear selector body, a speaker integral with the gear selector body, and a processor configured to select and communicate a message from a message set to the variable display and the speaker. A method includes providing a gear selector having an integral variable display, selecting a message from a message set, transmitting the message to the variable display, and displaying the message.

18 Claims, 3 Drawing Sheets

MOTOR VEHICLE GEAR SELECTOR WITH INTEGRATED DISPLAY

TECHNICAL FIELD

The present invention generally relates to motor vehicles, and more particularly relates to motor vehicle gear selectors with integrated displays.

BACKGROUND OF THE INVENTION

Conventional motor vehicles include a gear selector or shifter to operate the motor vehicle. The gear selector in a motor vehicle having a manual transmission is typically located on the center console. The gear selector in a motor vehicle having an automatic transmission is generally located on the center console or proximate the instrument panel. During operation, the gear selector typically only includes an indication of the gear in which the transmission is operating. Specifically, an indicator for a manual transmission typically indicates whether the transmission is in a numeric gear or in reverse, and an automatic transmission typically indicates whether the transmission is in park, drive, neutral, high gear, and low gear (referred to as a PRDNL) or TAP +/− selections. The indicators are generally located on the center console or on the instrument panel proximate the gear selector. While these configurations provide useful information to users, additional information provided on the gear selector would enhance the driving experience.

Accordingly, it is desirable to provide motor vehicle gear selectors comprising a display for selectively displaying messages to a passenger (i.e., the driver and/or another person(s)) of the motor vehicle. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Various embodiments provide motor vehicle gear selectors. One motor vehicle gear selector comprises a gear selector body and a variable display integral with the gear selector body and configured to display a first message. The motor vehicle gear selector also comprises a processor coupled to the variable display, the processor configured to select the first message from a message set and communicate the message to the variable display.

Another motor vehicle gear selector comprises a shift console, a gear selector body configured to articulate with respect to the shift console, a variable display integral with the gear selector body and configured to display a shift pattern and a visual message, and a speaker integral with the gear selector body and configured to produce an auditory message corresponding to the visual message. The motor vehicle gear selector also comprises a processor coupled to the variable display and the speaker, wherein the processor is configured to select the first and second messages from a message set and communicate the messages to the variable display and the speaker.

Methods for providing information within a vehicle are also provided. A method comprises the steps of providing, within the vehicle interior, a gear selector having an integral variable display and selecting a first message from a message set. The first message is transmitted to the variable display and the message is displayed.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
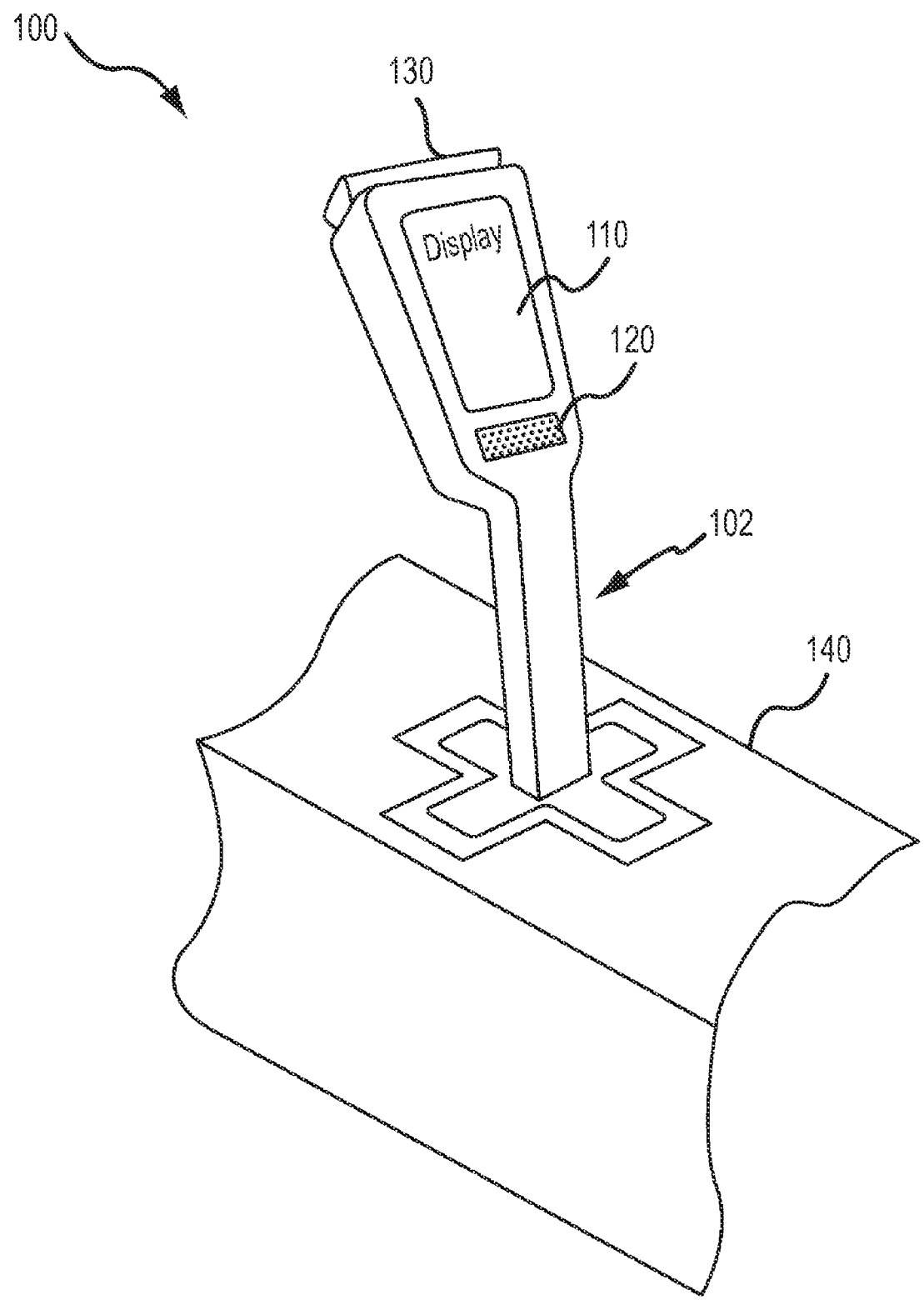
FIG. 1 is a schematic diagram of one exemplary embodiment of a motor vehicle gear selector comprising an integrated display.

FIG. 1 is a schematic diagram of one exemplary embodiment of a motor vehicle gear selector 100, also referred to as a shifter. In the illustrated embodiment, motor vehicle gear selector 100 includes an elongated gear selector body (or simply "body") 102 that articulates with respect to a shift console 140. Shift console 140 may be a center shift console or a console located in any suitable location within the automotive interior, for example, near the instrument panel, steering column, or other location within the motor vehicle.

A display 110 and/or a speaker 120 are mounted on or otherwise integrated into body 102 of motor vehicle gear selector 100. Display 110 may be any device, hardware, and/or software capable of displaying one or more messages selected from a set of messages or "message" set stored in a suitable memory. In accordance with various embodiments, display 110 is a variable display—i.e., a display that is composed of an array of individually-addressable pixels or is otherwise configured as a general purpose display capable of providing a graphical representation of messages as described herein. Such a display is in contrast to unchangeable, pre-determined display elements integrated into the gear selector body, such as conventional illuminated "D", "R", and "P" indicators. Examples of display 110 include, but are not limited to, a liquid crystal display (LCD), a thin-film-transistor (TFT) display, a light emitting diode (LED) display, an organic light emitting diode (OLED) display, a cathode-ray tube (CRT) display, and the like. In accordance with various exemplary embodiments, display 110 is configured to display the gear in which the transmission is currently operating, TAP +/− selection, warning messages, informational messages (e.g., gear shift patterns), instructional messages, and/or the like messages. For example, display 110 may warn a driver that the driver is unable to shift gears when the motor vehicle is traveling above or below a threshold speed. Specifically, display 110 may warn the driver that he/she is unable to shift into reverse if the motor vehicle is traveling at a speed greater than 5 miles-per-hour. The font, language, character set, and any other attributes of the message set may be selected depending upon the country in which the gear selector is deployed.

Various exemplary embodiments of the invention contemplate that display 110 may concurrently display two or more messages. For example, display 110 may display the gear that the transmission is currently operating in while concurrently displaying that the transmission fluid needs to be changed or some other message.

In one embodiment, display 110 also includes 3-dimensional graphics for displaying the various messages. Display 110 is also configured to provide the messages in a predetermined pattern depending on the type of message being displayed. For example, a warning message may be displayed in a particular color (e.g., red) or colors, and/or in a particular manner (e.g., flashing, brighter intensity, different sizes, and/or the like manner) or manners.

Speaker 120 is configured to generate auditory cues—i.e., sounds that convey the messages to the passenger(s). The sounds generated by speaker 120 may resemble the voice of a human and/or may be custom sounds that depend on the message. For example, a message may be voiced (e.g., "You are traveling at an excessive speed," "I'm sorry that operation/function is unavailable at this time," "Please shift gears," and the like messages). Furthermore, the voiced message may be preceded and/or followed by an audible sound (e.g., buzzing sounds, beeping sounds, tones, music, jingles, and the like sounds).

In one embodiment, the sounds generated by speaker 120 coincide with the messages displayed on display 110, although various embodiments contemplate that the sounds generated by speaker 120 may not coincide with the messages displayed on display 110. That is, a driver may receive messages both visually (via display 110) and audibly (via speaker 120). For example, display 110 may display the words "PLEASE SHIFT GEARS," at substantially the same time speaker 120 voices "PLEASE SHIFT GEARS."

Although the above discussion discusses various exemplary messages, the present invention is not limited to such messages. That is, the scope and spirit of the invention contemplates that display 110 and/or speaker 120 may transmit any message or combination of messages that may benefit a passenger. Therefore, display 110 and/or speaker 120 may be configured to transmit an infinite number of message types, whether individually or in combination with one another.

As illustrated in FIG. 1, motor vehicle gear selector 100 also comprises at least one manually actuatable lock/unlock button 130 for locking and unlocking display 110 and/or 120. When lock/unlock button 130 is locked, display 110 and/or speaker 120 may be muted. That is, display 110 may be grayed/blacked out, still framed, disabled, etc., while speaker 120 may not be able to generate audible sounds.

When lock/unlock button 130 is unlocked, display 110 and/or speaker 120 are unmuted. That is, display 110 and/or speaker 120 operate in the manner discussed above.

Although FIG. 1 illustrates a single lock/unlock button 130, various embodiments of the invention contemplate that motor vehicle gear selector 100 may comprise more than one lock/unlock button 130. For example, display 110 may be controlled by a first lock/unlock button 130 and speaker 120 may be controlled by a second lock/unlock button 130.

Figure 2:
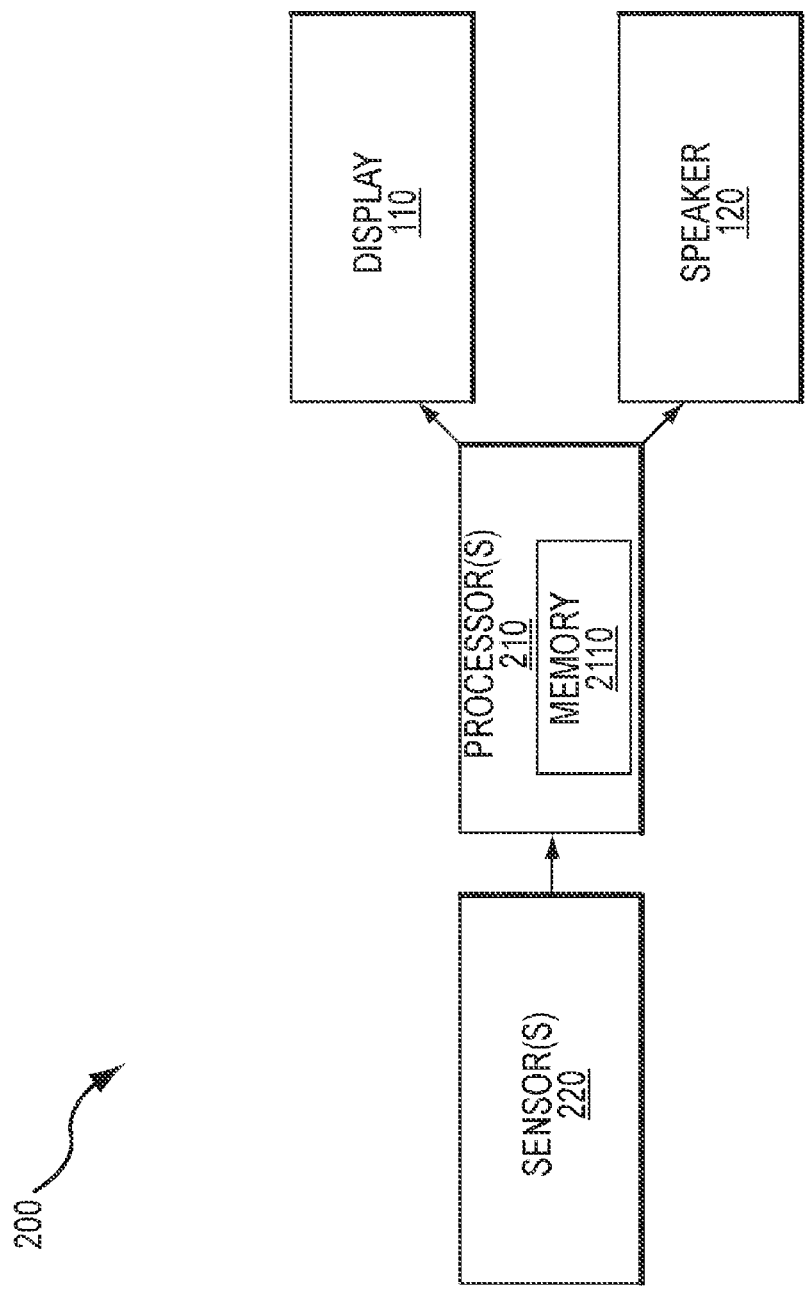
FIG. 2 is a block diagram of one exemplary embodiment of a system for transmitting messages to a passenger via the motor vehicle gear selector of FIG. 1.

FIG. 2 is a block diagram of one exemplary embodiment of a system 200 for transmitting messages to a passenger (e.g., the driver or other person) via a motor vehicle gear selector (e.g., motor vehicle gear selector 100). System 200 comprises at least one processor 210 coupled to display 110 and/or speaker 120, and at least one sensor 220 coupled to processor 210.

Processor 210 comprises memory 2110 for storing at least one of the various messages discussed above with reference to FIG. 1. Furthermore, processor 210 is configured/programmed to receive various signals from sensor(s) 220, process the various signals, and transmit a signal comprising an appropriate message for display on display 110 and/or for audible transmission via speaker 120 to the passenger(s) in the motor vehicle in response to the signals received from sensor(s) 220.

Sensor(s) 220 are sensors for detecting the physical properties of one or more components of a motor vehicle and transmitting a signal representing the sensed physical properties to processor 210. Specifically, sensor(s) 220 are appropriately placed on/in the motor vehicle and configured to detect, for example, the gear the transmission is in, the speed of the motor vehicle, the location of the motor vehicle (e.g., a global positioning system (GPS)), the temperature of various components, oil pressure, fuel levels, battery charge, environmental properties (e.g., cabin or outside temperature), an attempt to switch gears, if a seat belt is buckled, and the like physical properties.

Figure 3:
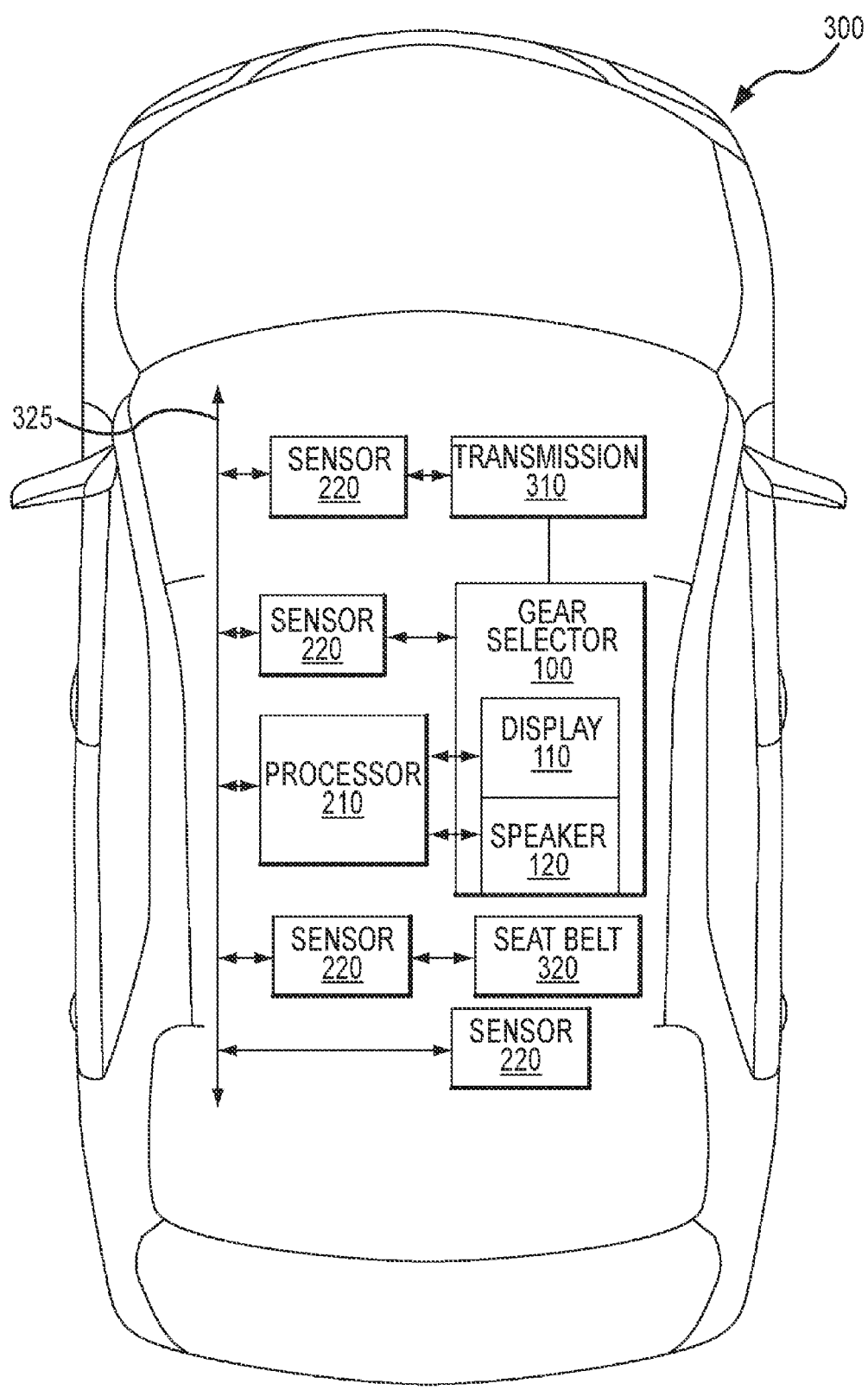
FIG. 3 is a schematic diagram of one exemplary embodiment of a motor vehicle comprising the motor vehicle gear selector of FIG. 1 and the system of FIG. 2.

FIG. 3 is a schematic diagram of an exemplary embodiment of a motor vehicle 300 comprising system 200 and motor vehicle gear selector 100. Motor vehicle 300 also comprises a transmission 310 and a seat belt 320.

In the embodiment illustrated in FIG. 3, system 200 comprises four sensors 220 coupled to processor 210 via a bus 325. One sensor 220 is coupled to transmission 310 and configured to monitor/determine the present operating gear of transmission 310 and transmit signals to processor 210 (via bus 325) indicating such operating gear.

A second sensor 220 is coupled to motor vehicle gear selector 100 and configured to monitor/determine if a user is attempting to shift gears in a manner that may damage transmission 310 and transmit a signal to processor 210 indicating such attempt. For example, this sensor 220 may be configured to detect if a passenger is attempting to shift transmission 310 into a lower gear or into reverse when motor vehicle 300 is traveling at a rate of speed greater than a threshold rate of speed and notify processor 210 of such if an attempt is detected. A message associated with the current transmission state, and the advisability of shifting to certain gears, may then be displayed to the user.

A third sensor 220 is coupled to seat belt 320 (or another passive restraint mechanism) to detect/determine if seat belt 320 is buckled when motor vehicle 300 is operating. This sensor 220 is also configured to notify processor 210 (via bus 325) if seat belt 320 is not buckled when motor vehicle 300 is traveling at a rate of speed greater than a threshold rate of speed.

The fourth sensor 220 is located on motor vehicle 300 in a location where this sensor is capable of monitoring an environmental state, such as the humidity, precipitation, or temperature outside motor vehicle 300. This sensor is configured to notify processor (via bus 325) when the outside temperature is greater than and/or less than a threshold temperature. For example, this sensor 220 may notify processor 210 that the outside temperature is less than a threshold temperature so that processor 210 can notify a passenger (via display 110 and/or speaker 120) to turn up the heat in the passenger cabin. In another example, the fourth sensor 220 may be configured to notify processor 210 that the outside temperature is greater than a threshold temperature so that processor 210 can notify a passenger (via display 110 and/or speaker 120) to turn down or OFF the air conditioner to avoid the engine overheating under particular operating conditions.

In the embodiment illustrated in FIG. 3, processor 210 is configured to transmit visual (via display 110) and/or audible (via speaker 120) messages appropriate for the conditions detected by sensors 220. For example, processor 210 may command display 110 and/or speaker 120 to display and/or audibly notify a passenger of the present operating gear of transmission 310.

Processor 210 may command display 110 and/or speaker 120 to display and/or audibly notify the driver that he/she should change gears. Processor 210 may also command display 110 and/or speaker 120 to display and/or audibly notify the driver that he/she cannot shift gears under particular operating conditions. Furthermore, processor 210 may command display 110 and/or speaker 120 to display and/or audibly notify the driver that he/she should buckle seat belt 320.

Although motor vehicle 300 has been discussed as comprising four sensors 220 monitoring transmission 310, motor vehicle gear selector 100, seat belt 320, and the outside temperature, motor vehicle 300 is not limited to this configuration. That is, motor vehicle 300 may include any number of sensors 220 notifying processor 210 of various conditions of motor vehicle 300 so that processor 210 can, in response to such notification, command display 110 and/or speaker 120 to display and/or audibly transmit appropriate messages to the passenger(s).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A motor vehicle gear selector, comprising:
   a gear selector body;
   a variable display integral with the gear selector body and comprising an array of individually-addressable pixels, wherein the variable display is configured to display a graphical representation of a first message;
   a processor coupled to the variable display, the processor configured to select the first message from a message set and communicate the first message to the variable display; and
   a speaker integral with the gear selector body and coupled to the processor, the speaker configured to produce an auditory cue corresponding to a second message selected from the message set.

2. The gear selector of claim 1, wherein the first and second messages are equivalent messages transmitted to the variable display and the speaker at substantially the same time.

3. The gear selector of claim 1, wherein the variable display is a liquid crystal display.

4. The gear selector of claim 1, wherein the variable display is a thin film transistor (TFT) display.

5. The gear selector of claim 1, wherein the variable display is a light emitting diode (LED) display.

6. The gear selector of claim 1, wherein the gear selector body articulates with respect to a shift console located in a central region adjacent a seat within the motor vehicle.

7. The gear selector of claim 1, wherein the gear selector body articulates with respect to a shift console located adjacent an instrument panel within an automobile.

8. The gear selector of claim 1, wherein the variable display is configured to produce a three-dimensional representation of the first message.

9. The gear selector of claim 1, further including a manually actuatable button configured to activate and deactivate the variable display.

10. The gear selector of claim 1, further including a manually-actuatable button configured to activate and deactivate the speaker.

11. The gear selector of claim 1, wherein the message set includes a message associated with an environmental state selected from the group consisting of temperature, humidity, and precipitation.

12. The gear selector of claim 1, wherein the message set includes a message associated with the state of a passive restraint mechanism.

13. The gear selector of claim 1, wherein the messages set includes a message associated with a current transmission state.

14. The gear selector of claim 1, wherein an attribute of the message set is selectable based on an intended country of deployment.

15. A motor vehicle gear selector comprising:
   a shift console;
   a gear selector body configured to articulate with respect to the shift console;
   a variable display integral with the gear selector body and configured to display a shift pattern and a visual message;
   a speaker integral with the gear selector body and configured to produce an auditory message corresponding to the visual message; and
   a processor coupled to the variable display and the speaker, the processor configured to select the visual and auditory messages from a message set and communicate the visual and auditory messages to the variable display and the speaker, respectively.

16. The gear selector of claim 15, wherein the processor is further configured to receive sensor information relating to the state of the vehicle and the state of the external environment, and to select the visual and auditory messages from the message set based on the sensor information.

17. A method for providing information within a vehicle, the method comprising:
   providing, within the vehicle interior, a gear selector having an integral variable display comprising an array of individually-addressable pixels and an integral variable speaker;
   selecting a first message from a message set;
   transmitting the first message to the variable display;
   displaying a graphical representation of the first message on the variable display;
   selecting a second message from the message set; and
   transmitting the second message to the speaker, wherein the second message is an auditory cue corresponding to the first message.

18. The method of claim 17, further including the step of sensing a state of the vehicle or the environment, wherein the selecting step includes selecting the first message based on the state.

* * * * *